United States Patent
Lee et al.

(10) Patent No.: US 12,301,915 B2
(45) Date of Patent: May 13, 2025

(54) DISPLAY DEVICE AND METHOD FOR CONTROLLING THE SAME

(71) Applicant: LG ELECTRONICS INC., Seoul (KR)

(72) Inventors: Jang Hee Lee, Seoul (KR); Seon Il Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 17/904,779

(22) PCT Filed: Feb. 21, 2020

(86) PCT No.: PCT/KR2020/002537
§ 371 (c)(1),
(2) Date: Aug. 22, 2022

(87) PCT Pub. No.: WO2021/167141
PCT Pub. Date: Aug. 26, 2021

(65) Prior Publication Data
US 2023/0049905 A1    Feb. 16, 2023

(51) Int. Cl.
*H04N 21/422* (2011.01)
*H04N 21/4227* (2011.01)

(52) U.S. Cl.
CPC . *H04N 21/42221* (2013.01); *H04N 21/42227* (2013.01); *H04N 21/4227* (2013.01)

(58) Field of Classification Search
None
See application file for complete search history.

(56) References Cited

U.S. PATENT DOCUMENTS

| 7,484,234 B1 * | 1/2009 | Heaton | H04N 21/42204 |
| | | | 725/141 |
| 11,722,218 B2 * | 8/2023 | Lee | H04N 21/42204 |
| | | | 398/115 |

(Continued)

FOREIGN PATENT DOCUMENTS

| KR | 101836379 | 3/2018 |
| KR | 101924715 | 12/2018 |

(Continued)

OTHER PUBLICATIONS

PCT International Application No. PCT/KR2020/002537, International Search Report dated Nov. 11, 2020, 3 pages.

(Continued)

*Primary Examiner* — John W Miller
*Assistant Examiner* — Sean N. Haiem
(74) *Attorney, Agent, or Firm* — LEE, HONG, DEGERMAN, KANG & WAIMEY

(57) ABSTRACT

The present invention relates to a display device, and to a method for controlling the same. To this end, the display device of the present invention may comprise a communication unit and at least one processor. The communication unit may receive a first code for a first key input from a remote control device. The at least one processor transmits a command for the received first code to an infrared blaster through the communication unit, and based on receiving a control signal for the first key from a peripheral device connected to be operable with the display device, the processor may be configured to operate the display device.

23 Claims, 11 Drawing Sheets

(56) References Cited

U.S. PATENT DOCUMENTS

| | | | |
|---|---|---|---|
| 2001/0019367 A1* | 9/2001 | Walton | H04N 21/41265 348/E7.071 |
| 2001/0053274 A1* | 12/2001 | Roelofs | H04L 12/2805 348/E7.071 |
| 2002/0194596 A1* | 12/2002 | Srivastava | H04N 21/42204 725/139 |
| 2003/0195969 A1 | 10/2003 | Neuman | |
| 2005/0151886 A1* | 7/2005 | Hirano | H04N 21/42221 348/E5.103 |
| 2005/0166222 A1* | 7/2005 | Tully, Jr. | G08B 27/008 725/33 |
| 2007/0294372 A1* | 12/2007 | Hlasny | H04L 12/2812 709/219 |
| 2010/0053468 A1* | 3/2010 | Harvill | H04N 21/42204 348/734 |
| 2013/0057465 A1* | 3/2013 | Lee | G08C 23/04 345/156 |
| 2014/0233909 A1* | 8/2014 | Neuman | H04N 21/43622 386/234 |
| 2015/0255037 A1* | 9/2015 | Candelore | G01S 5/16 345/2.3 |
| 2016/0198465 A1* | 7/2016 | Britt | H04M 15/8055 455/450 |
| 2019/0043345 A1* | 2/2019 | Owrang | G08C 23/04 |
| 2019/0069042 A1* | 2/2019 | Choi | H04N 21/4622 |

FOREIGN PATENT DOCUMENTS

| | | |
|---|---|---|
| KR | 1020190023315 | 3/2019 |
| WO | 2016111916 | 7/2016 |

OTHER PUBLICATIONS

European Patent Office Application Serial No. 20919940.5, Search Report dated Oct. 20, 2023, 8 pages.

* cited by examiner

[FIG. 1]
100
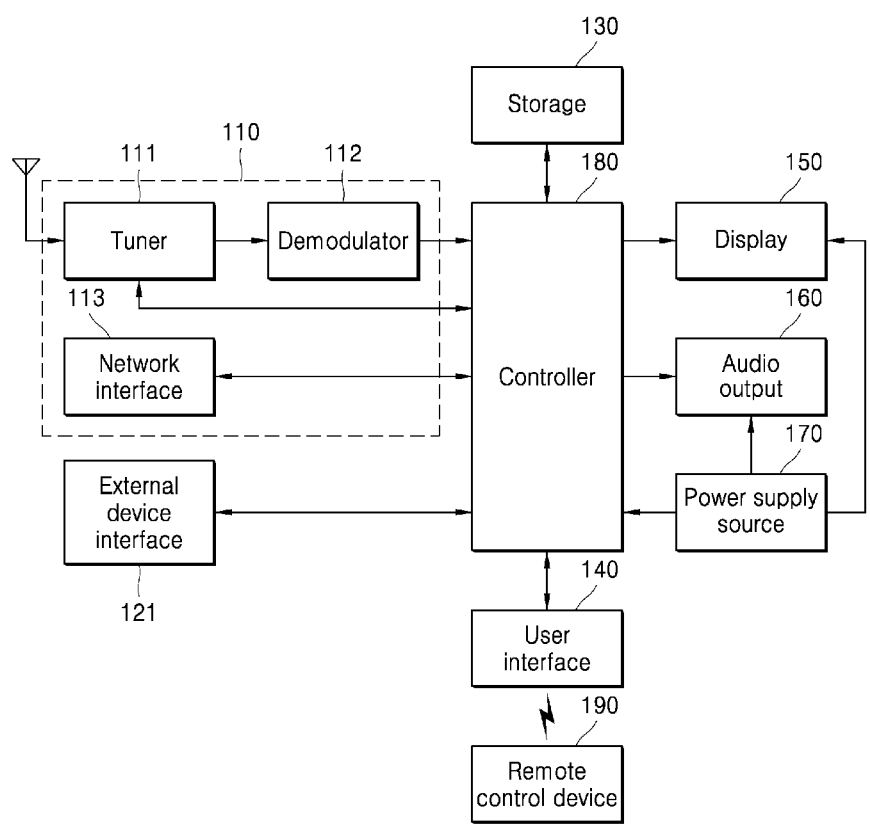

[FIG. 2]
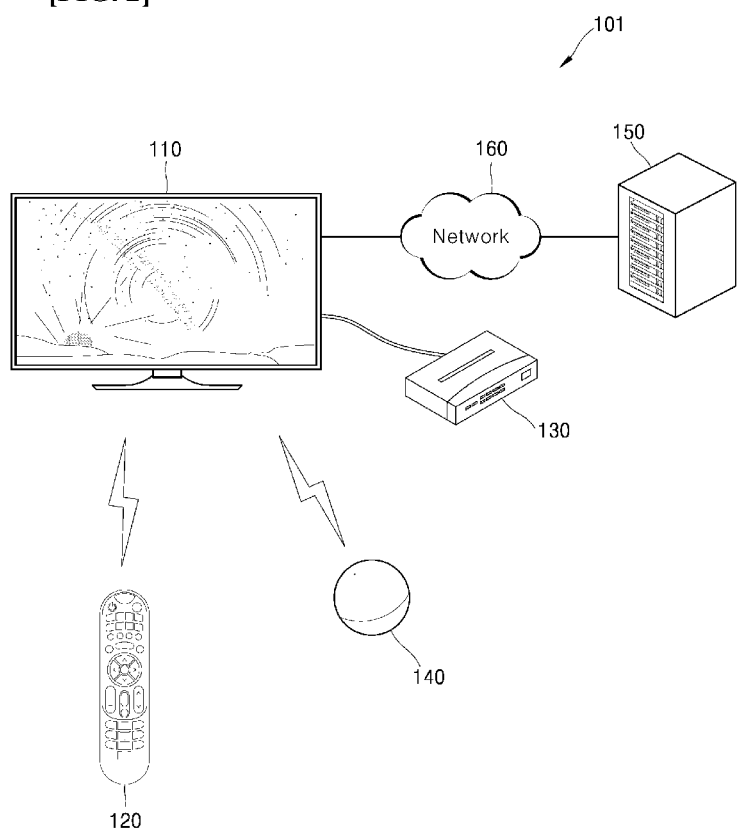

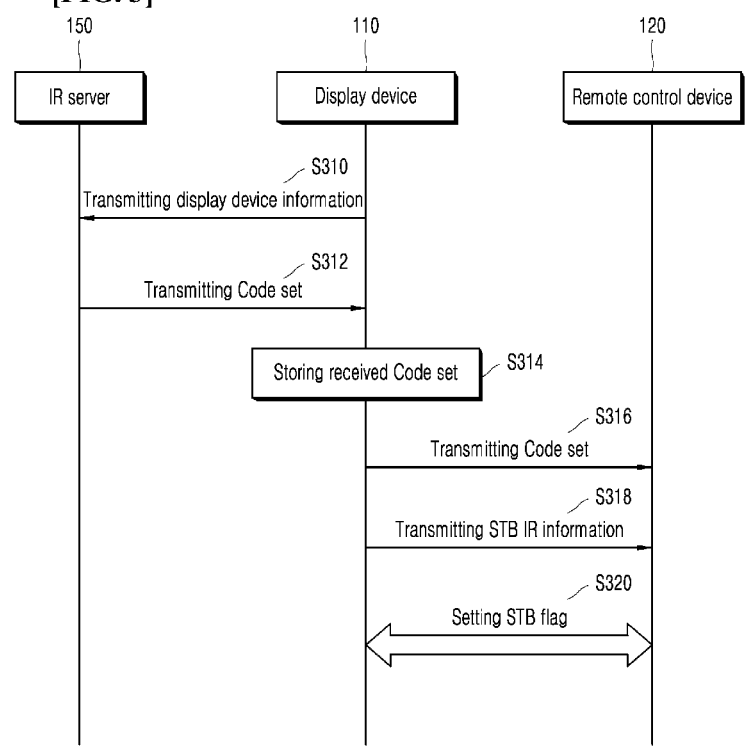
[FIG. 3]

[FIG. 4]
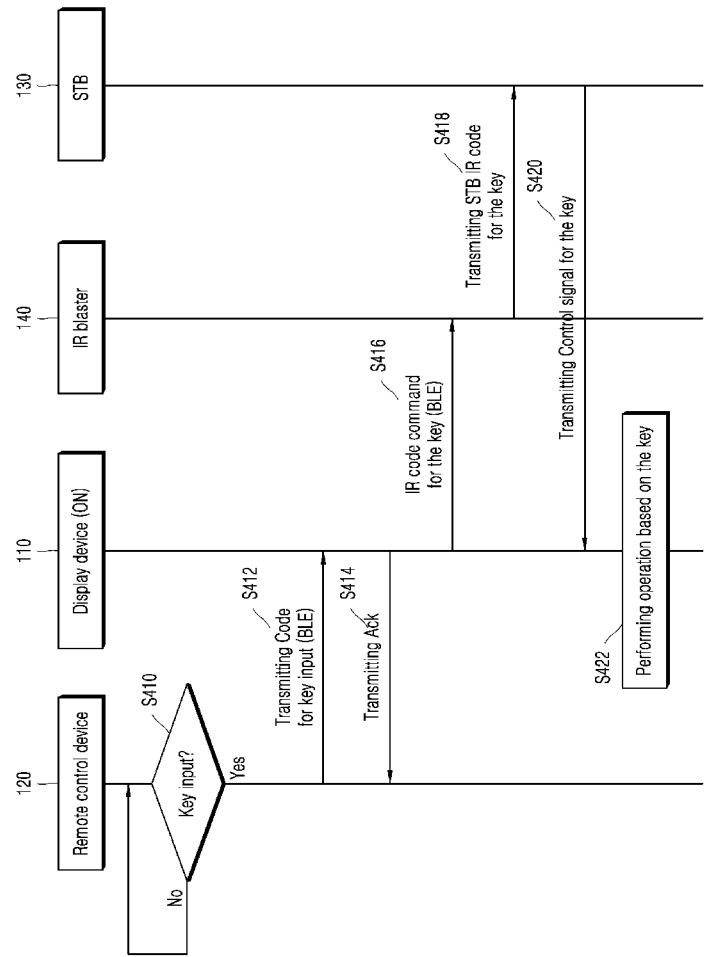

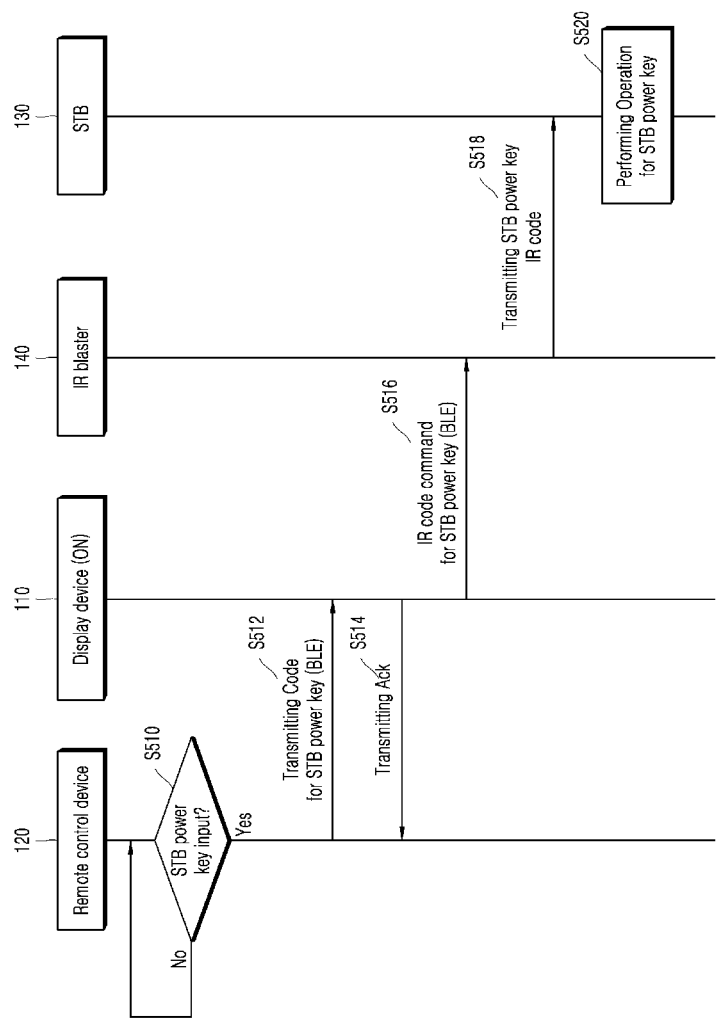
[FIG. 5]

[FIG. 6]
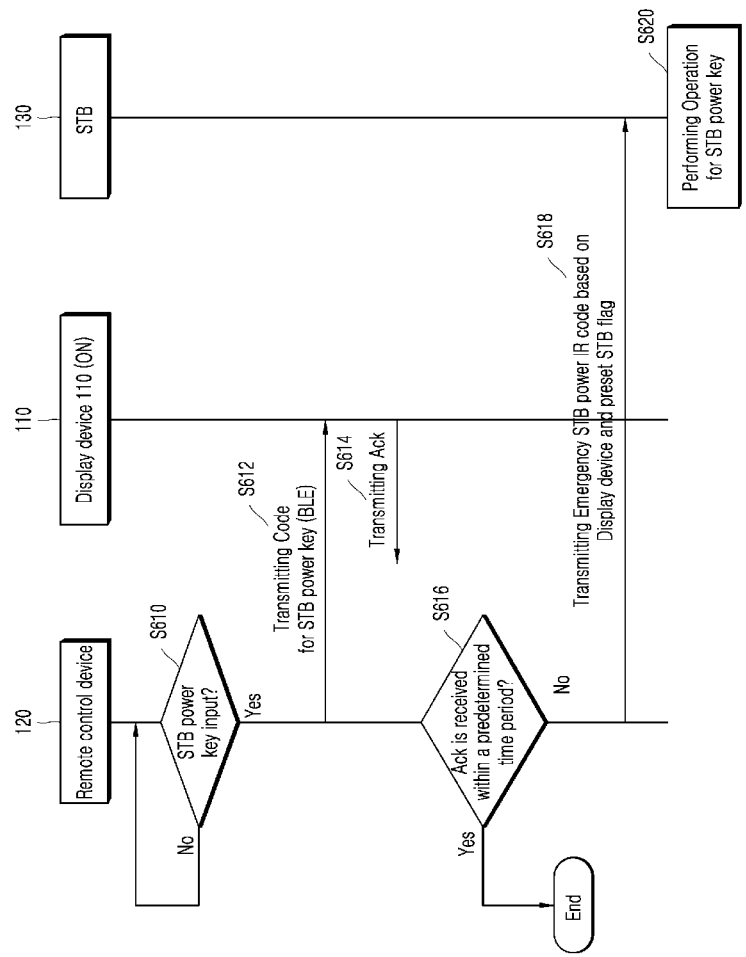

[FIG. 7]
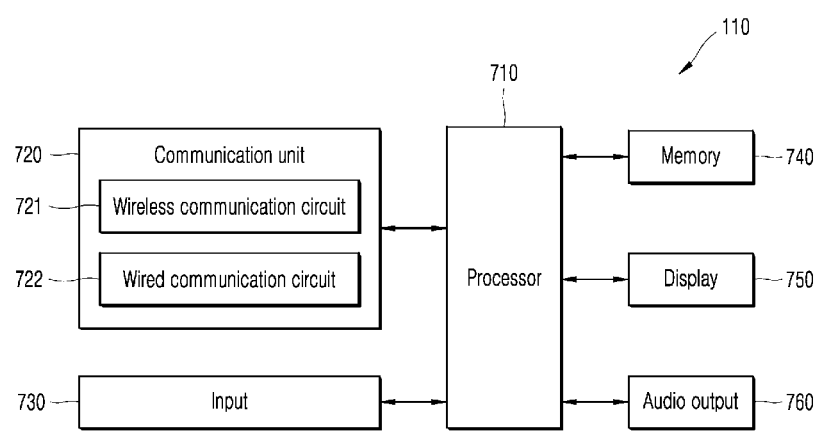

[FIG. 8]
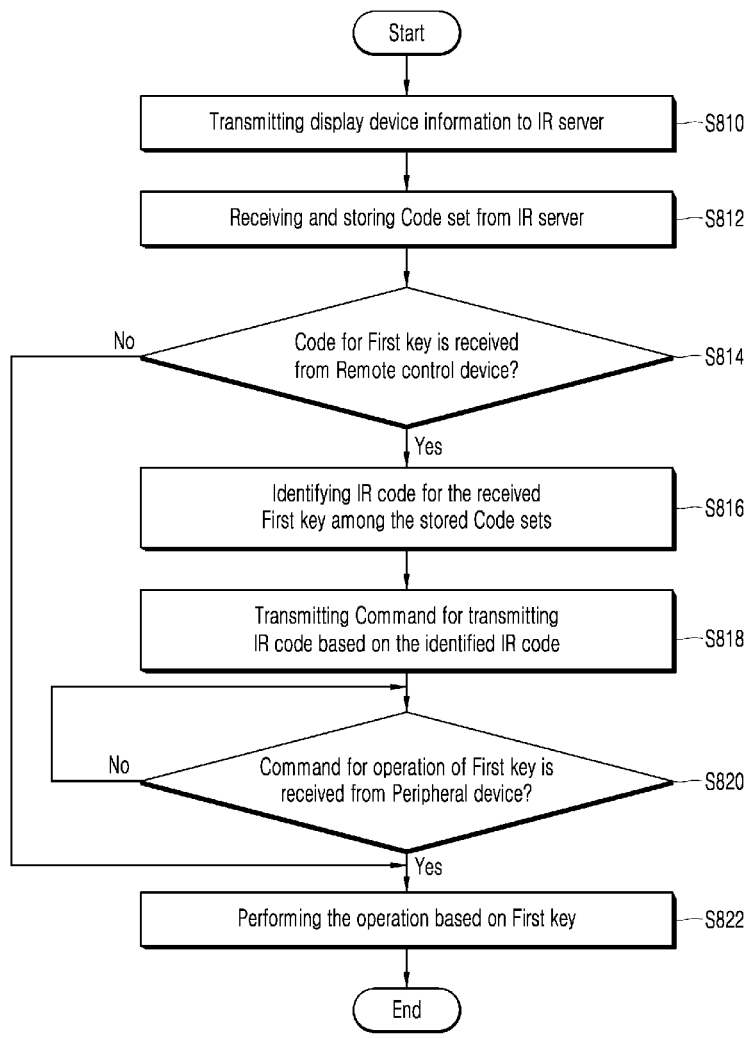

[FIG. 9]
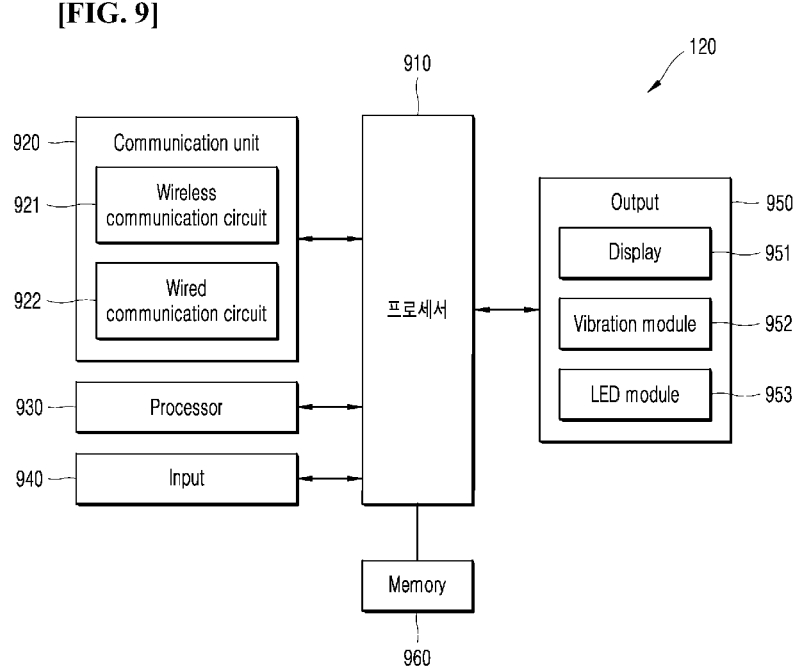

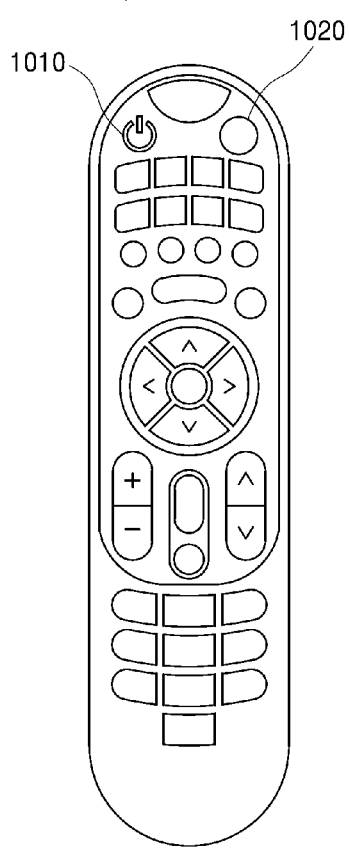
[FIG. 10]

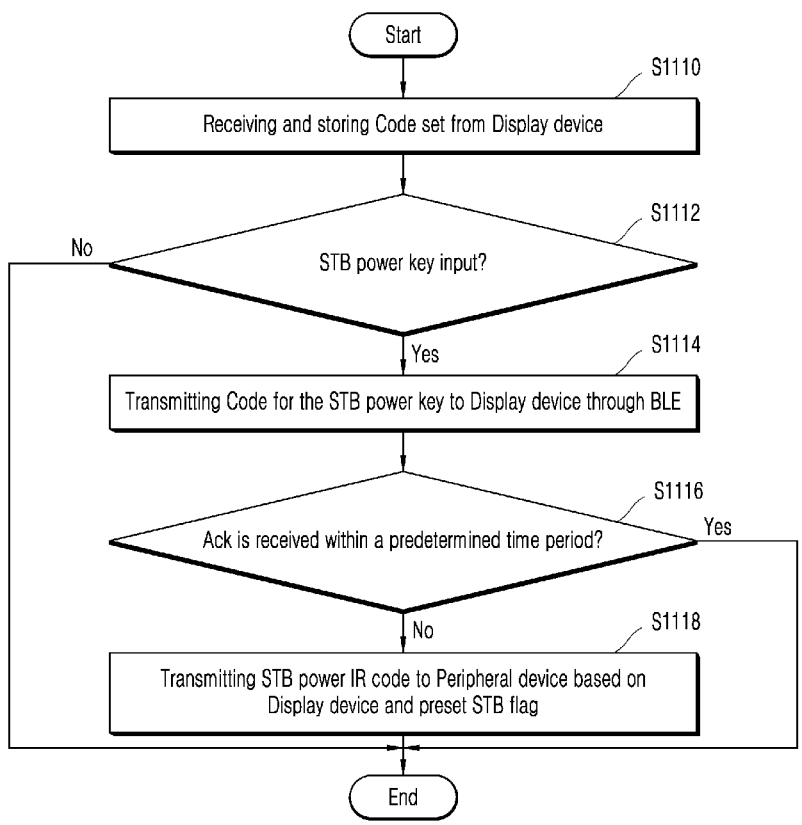
[FIG. 11]

DISPLAY DEVICE AND METHOD FOR CONTROLLING THE SAME

CROSS-REFERENCE TO RELATED APPLICATION(S)

This application is the National Stage filing under 35 U.S.C. 371 of International Application No. PCT/KR2020/002537, filed on Feb. 21, 2020, the contents of which are all incorporated by reference herein in its entirety.

TECHNICAL FIELD

The present disclosure relates to a display device and a method of controlling the same.

BACKGROUND ART

In general, a display device is a device having a function of providing a user with a video. Such a display device may be connected to a peripheral device (e.g., a set-top box) and display various image services. The display providing such image services and the peripheral device may be controlled via a remote control device (e.g., a remote controller).

By the way, the peripheral device is likely not to receive the infrared (IR) transmitted by the remote control device, if the peripheral device is located in a place where it cannot receive a signal from the remote control device (e.g., in a cabinet) or if it is not oriented with the remote control device or due to other obstacles.

Accordingly, there is a need to improve convenience for users through smooth communication between the remote control device, the display device, and the peripheral device.

DESCRIPTION OF DISCLOSURE

Technical Problems

Accordingly, an object of the present disclosure is to address the above-noted and other problems and to provide smooth communication between a remote control device, a display device and a peripheral device.

Another object of the present disclosure is to provide smooth communication between the remote control device and the peripheral device through an IR blaster configured to transmit the signal received from the display device.

A further object of the present disclosure is to provide smooth communication between the remote control device and the peripheral device by setting a flag between the display device and the remote control device.

A still further object of the present disclosure is to provide smooth communication between the display device and the peripheral device by allowing an IR blaster to transmit a signal received from the display device to the peripheral device based on a flag setting between the display device and the IR blaster.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To solve the above technical problems, the present disclosure may further include IR blaster configured to transceive an IR signal in addition to the display device, the peripheral device, the remote control device, thereby providing smooth communication between the display device, the peripheral device and the remote control device.

To this end, the display device may include a communication unit and at least one processor. The communication unit may receive a first code for a first key input from the remote control device. The at least one processor may be transmit a command for the received first code to the IR blaster through the communication unit and operate the display device based on reception of a control signal for the first key from a peripheral device connected to be operable with the display device.

Furthermore, a device according to the present disclosure may include a communication unit, at least one processor and a memory connected to be operable with the communication unit and the at least one processor. The memory may store instructions for instructing the at least one processor to receive a first code for a first key input from a remote control device through the communication unit, transmit a command for the received first code to an IR blaster through the communication unit, and operate the display device based on reception of a control signal for the first key from a peripheral device connected to be operable with the display device.

Still further, a method for controlling a display device according to the present disclosure may include receiving a first code for a first key input from a remote control device through a communication unit; transmitting a command for the received first code to an IR blaster through the communication unit; and operating the display device based on reception of a control signal for the first key from a peripheral device connected to be operable with the display device.

Advantageous Effect

The present disclosure may have following advantageous effects. The present disclosure may further include IR blaster configured to transceive an IR signal in addition to the display device, the peripheral device, the remote control device, thereby providing smooth communication between the display device, the peripheral device and the remote control device.

In addition, the present disclosure may provide smooth communication between the remote control device and the peripheral device by setting a flag between the display device and the remote control device.

In addition, based on the flag setting between the display device and the IR blaster, the IR blaster may transmit the signal received from the display device to the peripheral device, thereby providing smooth communication between the display device and the peripheral device.

In addition, the present disclosure may perfectly control the peripheral device by pairing the display device and the remote control device, and it may perfectly control the peripheral device by paring the display device and the IR blaster. Accordingly, usability of the remote control device may be improved.

In addition, when the power of the display device is an OFF state, the remote control device may directly transmit the IR signal for the power key of the peripheral device to the peripheral device. Accordingly, the peripheral device may be controlled regardless of ON and OFF of the display device and usability can be improved.

Specific effects are described along with the above-described effects in the section of Detailed Description.

BRIEF DESCRIPTION OF DRAWINGS

FIG. 1 is a block view of a display device according to an embodiment of the present disclosure;

FIG. 2 is an exemplary view showing a system according to an embodiment of the present disclosure;

FIG. 3 is a flow chart showing the operation of the display device according to an embodiment of the present disclosure;

FIG. 4 is a flow chart showing an operation of a system according to an embodiment of the present disclosure;

FIG. 5 is a flow chart showing an operation of a system according to another embodiment of the present disclosure;

FIG. 6 is a flow chart showing an operation of a system according to a further embodiment of the present disclosure;

FIG. 7 is a schematic view of a display device according to an embodiment of the present disclosure;

FIG. 8 is a flow chart showing an operation of a display device according to an embodiment of the present disclosure;

FIG. 9 is a schematic view of a remote control device according to an embodiment of the present disclosure;

FIG. 10 is an exemplary view of a remote control device according to an embodiment of the present disclosure; and FIG. 11 is a flow chart showing an operation of a remote control device according to an embodiment of the present disclosure.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

These terms are generally only used to distinguish one element from another. It will be understood that when an element is referred to as being "connected with" or "coupled to" another element, the element can be directly connected with the other element or intervening elements may also be present. In contrast, when an element is referred to as being "directly connected with" another element, there are no intervening elements present.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Hereinafter, a display device and a method of controlling the same according to several embodiments of the present disclosure will be described.

FIG. 1 is a block view of a display device according to an embodiment of the present disclosure.

Referring to FIG. 1, a digital device 100 may include a broadcast receiver 110, an external device interface 121, a storage 130, a user interface 140, a display 150, an audio output 160, a power supply source 170 and a controller 180.

In this instance, the broadcast receiver 110 may include a tuner 111, a demodulator 112 and a network interface 113. However, in some cases, the broadcast receiver 110 may include the tuner and the demodulator 112, but may not include the network interface 113, and vice versa.

Although not shown in the drawings, the broadcast receiver 110 may include a multiplexer. In this instance, the multiplexer may multiplex a signal demodulated by the demodulator and the signal received through the interface 113. In addition, the broad receiver 110 may further include a demultiplexer, although not shown in the drawings. The demultiplexer may be configured to demultiplex the multiplexed signal, the signal demodulated by the demodulator 112 or the signal received through the network interface 113.

The tuner 111 may be configured to tune a specific RF (Radio Frequency) broadcast signal. The specific RF broadcast signal may correspond to the channel selected by the user or all of the pre-stored channels. In addition, the tuner 111 may configured to convert a RF broadcast signal into an intermediate frequency (IF) signal or a baseband signal.

As one example, the tuner 111 may convert a RF broadcast signal that is a digital broadcast signal into a digital IF (hereinafter, DIF) signal, and may convert a RF broadcast signal that is an analog broadcast signal into an analog baseband video or audio signal (CVBS/SIF). In other words, the tuner 111 may process both the digital broadcast signal and the analog broadcast signal. The analog baseband video or audio signal CVBS/SIF may be directly input to the controller 180.

In addition, the tuner 111 may receive a RF broadcast signal of a single carrier or a multiple carrier. The tuner 111 may sequentially tune and receive RF broadcast signals of all broadcast channels stored through a channel memory function, and then convert the signals into intermediate frequency signals or baseband signals.

The demodulator 112 may be configured to receive and demodulate the digital IF signal converted by the tuner 111, and execute channel decoding. To this end, the demodulator 112 may include a trellis decoder, a de-interleaver, a reed-Solomon decoder, or may include a convolution decoder, a deinverter, and a reed-Solomon decoder.

After executing demodulation and channel decoding, the demodulator 112 may output a stream signal (TS). At this time, the stream signal may be a signal obtained by multiplexing a video signal, an audio signal or a data signal. As one example, the stream signal may be an MPEG-2 Transport Stream (TS) in which an MPEG-2 standard video signal, a Dolby AC-3 audio signal and the like are multiplexed.

The stream signal output by the demodulator 112 may be input to the controller 180. The controller 180 may control demultiplexing, video-audio signal processing, and then control the display 150 to output an image and the audio output 160 to output sound.

The external device interface 121 may provide an interfacing environment between the digital device 100 and various external devices.

The external device interface 121 may be connected to external devices such as DVD (Digital Versatile Disk), Blu-ray (Blu-ray), game device, camera, camcorder (Camcorder), computer (laptop), tablet PC, smart phone, Bluetooth A device (Bluetooth device), an external device such as a cloud (Cloud), etc by a wire or wirelessly. The external device interface 121 may transfer a signal including data input via the connected external devices (e.g., image, video, audio data) to the controller 180. The controller 180 may control the data signal already having processed as image, video and audio data to be output through the connected external devices. To this end, the external device interface 121 may further include an A/V input/output (not shown) or a wireless communication unit (not shown).

The A/V input/output may include s USB terminal, a CVBS (Composite Video Banking Sync) terminal, a component terminal, a S-video terminal (analog), a DVI (Digital Visual interface) terminal, a HDMI (High definition Multimedia Interface) terminal, an RGB terminal, a D-SUB terminal, and the like, in order to input the video and audio signal of the external device to the digital device 100.

The wireless communication unit may be configured to execute short range wireless communication with other devices. The digital device 100 may be network-connected to other digital devices via a communication protocol such as Bluetooth, Radio Frequency Identification (RFID), Infrared Data Association (IrDA), Ultra Wideband (UWB), Zig-Bee, and Digital Living Network Alliance (DLNA).

In addition, the external device interface 121 may be connected to a set-top-box (STB) and at least one of the above-described various terminals, and may perform input/output operations with the set-top-box (STB).

Meanwhile, the external device interface 121 may receive an application or an application list from an adjacent external device, and transmit it to the controller 180 or the storage 130.

The network interface 113 may be configured to provide an interface for connecting the digital device to a wired or wireless network. The network interface 113 may include an Ethernet terminal to link to a wired network, or may use communication standards such as WLAN (Wireless LAN), Wi-Fi, Wibro (Wireless broadband), Wimax (World Interoperability for Microwave Access), and HSDPA (High Speed Downlink Packet Access) to link to a wireless network.

The network interface 113 may transceive data with another digital device via the connected network or another network linked to the connected network. In particular, the network interface 113 may some content data stored in the digital device to a digital device selected from other pre-registered digital devices.

Meanwhile, the network interface 113 may access a predetermined webpage via the connected network or another network linked to the connected network. That is, the network interface 113 may access a predetermined webpage via the network, and transmit or receive data with a corresponding server. Rather than that, it may receive contents or data provided by a content provider or a network operator. Specifically, the network interface may receive contents such as movies, advertisements, games, VODs, broadcast signals, etc. and information related thereto, which are provided by a content provider or a network operator, via the network. In addition, it may receive update information and update files of firmware provided by the network operator. The network interface may also transmit data to an internet or content provider or a network operator.

The network interface 113 may select and receive a desired one among open applications via the network.

The storage 130 may be configured to store a program for processing and controlling each signal in the controller 180, and a signal-processed video, audio or data signal.

The storage 130 may be configured to temporarily store a video, audio or data signal input from the external device interface 121 or the network interface 113. The storage 130 may store information related to a predetermined broadcast channel through a channel memory function.

The storage 130 may also store an application or an application list input from the external device interface 121 or the network interface 220.

The storage 130 may store various platforms which will be described below.

The storage 130 may include at least one type storage media of a flash memory type, a hard disk type, a multimedia card micro type, a card type memory (e.g., SD or XD memory), RAM, EEPROM or the like. The digital device 100 may play a content file (e.g., a movie file, a still image file, a music file, a document file, an application file, etc) stored in the storage 130, to provide it to the user.

Meanwhile, the storage 130 may be provided in the controller 180 or separately provided from the controller 180.

The user input interface 140 may be configured to transmit a user input signal to the controller 180 or a signal of the controller 180 to the user.

For example, the user input interface 140 may be connected to a remote control device 190 based on various communication methods (e.g., RF communication or IR communication). The user input interface 140 may receive and process a control signal for power one/off, channel selection, screen setting or the like transmitted from the remote control device 190 or transmit a control signal to the remote control device 190. In addition, the user input interface 140 may transfer a control signal input from a local key such as a power key, a channel key, a volume key or a setting key to the controller 180.

The user input interface 140 may transfer a control signal input from a sensor unit (not shown) configured to sense a user's gesture to the controller 180 or the signal of the controller 180 to the sensor unit (not shown). Here, the sensor unit (not shown) may include a touch sensor, a voice sensor, a position sensor and a motion sensor.

The controller 180 may generate or output a signal for video or audio output by demultiplexing the stream input through the tuner 111, the demodulator 112 or the external device interface 121 or processing the demultiplexed signal.

The video signal processed by the controller 180 may be input to the display 150 and displayed on the display as a video corresponding to the video signal. In addition, the video signal processed by the controller 180 may be input to an external output device through the external device interface 121.

The audio signal processed by the controller 180 may be audio-output to the audio output 160. The audio signal processed by the controller 180 may be input to the external output device through the external device interface 121.

Meanwhile, the controller 180 may include a demultiplexer, a video processor.

The controller 180 may control an overall operation of the digital device 100. For example, the controller 180 may control the tuner 111 to tune RF broadcast corresponding a channel selected by the user or a pre-stored channel.

The controller 180 may control the digital device 100 based on a user's command input through the user input interface 140 or an internal program. In particular, by linking to the network, the controller 180 may control an application desired by the user or an application list to be downloaded in the digital device 100.

As one example, the controller 180 may control the tuner 111 to input a signal of the channel selected based on a predetermined channel selecting command received through the user input interface 140. The controller 180 may process a video, audio or data signal of the selected channel. The controller 180 may also control information on the channel selected by the user to be output through the display 150 or the audio output 160.

As another example, the controller 180 may control the display 150 or the audio output 160 to output the video signal or the audio signal from the external device based on an external device video play command received through the user input interface 140.

Meanwhile, the controller 180 may control the display 150 to display an image. As one example, the display 150 may be controlled to display a broadcast video input by the tuner 111, an external input video input through the external device interface 121, a video input through the network interface or a video stored in the storage 130. At this time, the image displayed on the display 150 may be a still image or a video file, or may be a 2D or 3D video.

In addition, the controller 180 may control the display 150 to play contents. The content may be content stored in the digital device 100 or broadcast content received in the digital device 100, or external input content. The content may be at least one of a broadcast video file, an external input video file, an audio file, a still image, a linked web image or a text file.

Meanwhile, when entering an application view item, the controller 180 may control to display an application or an application list that is downloadable from an internal or external network of the digital device 100.

The controller 180 may be implemented to install and drive the application downloaded from the external network together with various user interfaces. In addition, the controller 180 may control an image related to the application executed by the user's selection to be displayed on the display 150.

Although not shown in the drawings, the present disclosure may further include a channel browsing processor configured to generate a thumbnail image corresponding to a channel signal or an external input signal.

The channel browsing processor may receive an input of a stream signal output from the demodulator 112 or a stream signal output from the external device interface 121, and extract an image from the input stream signal, thereby generate a thumbnail image. The generated thumbnail image may be input to the controller as it is or encoded. Also, the generated thumbnail image may be input to the controller 180 as it is encoded in a stream type. The controller 180 may display a thumbnail list including a plurality of thumbnail images on the display 150. Meanwhile, the thumbnail images in the thumbnail list may be updated sequentially or simultaneously. Accordingly, the user may conveniently figure out the contents of the plurality of broadcast channels.

The display 150 may convert the video signal, data signal, ODS signal processed by the controller 180 or the video signal or data signal received from the external device interface 121 into R, G and B signals, respectively, to generate a driving signal.

The display 150 may be a PDP, an LCD, an OLED, a flexible display, 3D display or the like.

Meanwhile, the display 150 may be configured of a touch screen to be used as an input device as well as an output device.

The audio output 160 may output an input of a signal processed by the controller 180 (e.g., a stereo signal, a 3.1 channel signal and a 5.1 channel signal) as audio file. The audio output 160 may be implemented as various types of speakers.

To sense the user's gesture, the sensor unit (not shown) including at least one of a touch sensor, a voice sensor, a position sensor or a motion sensor may be further provided in the digital device 100 as described above. The signal sensed by the sensor (not shown) may be transmitted to the controller 180 via the user input interface 140.

Meanwhile, a photographing unit (not shown) configured to photograph the user may be further provided. Information on the image photographed in the photographing unit (not shown) may be input to the controller 180.

The controller 180 may detect the user's gesture by individually or combination with the image captured by the photographing unit (not shown) and a signal sensed by the sensor unit (not shown).

The power supply source 170 may be configured to supply power to the components of the digital device 100. In particular, the power supply source 170 may supply power to the controller 180 implemented as SoC (System on Chip), the display 150 for displaying images and the audio output 160 for outputting audio files.

To this end, the power supply source 170 may include a converter (not shown) configured to convert AC power to DC power. Here, when the display 150 is implemented as a liquid crystal panel including a plurality of backlight lamps, the power supply source 170 may further include an inverter (not shown) configured to perform pulse width modulation (PWM) to drive luminance variation or dimming driving.

The digital device 100 may be a digital broadcast receiver configured to process a digital broadcast signal of a fixed or mobile ATSC or DVB.

In addition, the digital device 100 may omit some components from the illustrated components as needed, or may further include components not shown in the drawings on the contrary. Unlike the above description, the digital device 100 may receive and play contents through the network interface or the external device interface, without the tuner and the demodulator.

Meanwhile, a display device (e.g., a smart TV) among the digital device types may be an intelligent device in which a computer support function is added to a broadcast receiving function. Accordingly, the display device such as a smart TV may include a plurality of software programs (e.g., a plurality of applications), and execute various operations implemented by the plurality of software programs, respectively, like a smart phone.

Hereinafter, referring to the above description, a display device and a method of controlling the same according to various embodiments of the present.

FIG. 2 is an exemplary view showing a system according to an embodiment of the present disclosure.

Referring to FIG. 2, the system 101 according to an embodiment may include a display device 110, a remote control device 120, an IR blaster 140 and a peripheral device 130. Alternatively, the system 101 according to an embodiment may further selectively include an IR server 150, in addition to the above-described devices (i.e., the display device 110, the remote control device 120, the IR blaster 140 and the peripheral device 130. As one example, when the IR server 150 is selectively provided, a network 160 for receiving a code set from the IR server 150 may be required.

According to one embodiment, the IR server 150 may transmit a code set including code information about at least one key (e.g., a button) provided in the peripheral device (e.g., STB box) and the remote control device 120 to the display device 110 through the network 160. The IR sever 150 may be a server managed by the manufacturer of the peripheral device 130 (e.g., STB box), or may be a server managed by the manufacturer of the display device 110.

According to one embodiment, the display device 110 may store the code set received from the IR server 150, and may transmit the stored code set to the remote control device 120 and the IR blaster 140. The display device 110 may receive a code for an arbitrary key input from the remote control device 120. The display device 110 may identify an IR code for the received code based on a preset code set. Then, the display device 110 may transmit a command for the identified IR code to the IR blaster 140. The command may include an instruction for instructing the IR blaster to transmit a corresponding IR code to the peripheral device. The display device 110 may be operable based on reception of a control signal for the key from the peripheral device connected to the display device 110 to operate together.

According to one embodiment, the peripheral device 130 may be connected to the display device 110 via HDMI (High-Definition Multimedia Interface) by a wire. The peripheral device 130 may include a set-top box (STB) configured to receive and convert a broadcast signal transmitted from a terrestrial wave, cable or satellite, and to provide the converted signal to the display device 150 to be viewed on the display device 150. The STB is a device configured to receive a broadcast signal through the tuner and convert the received broadcast signal into video, audio, text, etc by using a decoder, and transmit it to the display device 110. The STB may have a different structure depending on the transmission method, but it may mainly include a font-end part (e.g., the tuner and the demodulator) and a back-end part (e.g., MPEG2, a decode chip, a demultiplexer, graphic, audio and data processor) and an external interface.

According to one embodiment, the remote control device 150 may transceive a signal with the display device 110 and the peripheral device 130 based on RF communication standards and IR communication standards. The remote control device 150 may receive the code set received from the display device 110 and transmit an emergency STB power IR key to the peripheral device 130. As one example, unless receiving Ack based on an input of a STB power key from the display device 110, the remote control device 150 may transmit an emergency STB power IR key for the STB power key to the peripheral device 130 via BLE after a predetermined time period (e.g., 150 ms). The power intensity of the emergency SSTB power IR key may be greater than that of the conventional STB power IR key.

According to one embodiment, the IR blaster 140 may transceive a signal with the display device 110 and the peripheral device 130. The IR blaster 140 may communicate with the display device 110 through pairing with the display device 110. The IR blaster 140 may store the code set received from the display device 110, and may transmit information on at least one code received from the display device 110 to the peripheral device 130.

FIG. 3 is a flow chart showing the operation of the display device according to an embodiment of the present disclosure.

Hereinafter, referring to FIG. 3, the operation of the display device according to an embodiment of the present disclosure will be described in detail.

According to the embodiment, the display device 110 may transmit information of the display device to the IR server 150 (S310). When sensing wired or wireless connection with the peripheral device, the display device 110 may transmit information about the peripheral device to the IR server 150, to acquire information about the peripheral device. The information about the display device 110 may include at least one of an identifier (e.g., an internet protocol (IP) address, a media access control (MAC) address, a manufacturing number, etc) of the display device 110, an identifier of the peripheral device 130 (e.g., STB) wiredly or wirelessly connected to the display device 110, or an identifier of the remote control device 120 (e.g., a remote control) operable with the peripheral device 130. Alternatively, the information about the display device 110 may include at least one of a manufacturer and a product number of the peripheral device 130 or a manufacturer and a production number the remote control device 120 (e.g., a remote control) operable with the peripheral device 130. The IR server 150 may be a server storing various code sets for the peripheral device 130 (e.g., STB) and the remote control device 120 (e.g., a remote control) operable with the peripheral device 130 for each manufacturer or service provider. Codes for at least one key (e.g., a number key, a direction key, a volume control key, a channel change key, a power key, a menu key, a setting control key, etc) constituting the remote control device 120 (e.g., a remote control) may be provided as one code set.

According to one embodiment, the display device 110 may receive a code set from the IR server 150 (S312). The IR server 150 may identify a code set for the peripheral device 130 (e.g., STB) wiredly or wirelessly connected to the display device 110, and the remote control device 120 (e.g., a remote control) operable with the peripheral device 130 based on the information about the display device 110 received from the display device. The IR server 150 may transmit the identified code set to the display device 110 through the identification process. The IR server 150 may transmit a new code set to the display device 110 according to change of at least one of the peripheral device 130 and the display device 110.

According to one embodiment, the display device 110 may store the received code set (S314). The display device 110 may store the received code set in the memory. The code set may include a respective code for at least one key (e.g., a number key, a direction key, a volume control key, a channel change key, a power key, a menu key, a setting control key, etc) constituting the remote control device 120 (e.g., a remote control). The code set may include an instruction for operating a corresponding function based on an input (e.g., a touch input, a push input or a voice input) to at least one key provided in the remote control device 120 (e.g., a remote control).

According to one embodiment, the display device 110 may transmit the received code set to the remote control device 120 (S316). The display device 110 may transmit the received code set to the remote control device 120 based on pairing with the remote control device 120. The code set may include an instruction for operating a corresponding function based on an input (e.g., a touch input, a push input or a voice input) for at least one key provided in the remote control device 120 (e.g., a remote control). The pairing between the remote control device 120 and the display device 110 may start once the remote control device 120 transmit a pairing IR key to the display device 110. When receiving information having the pairing IR key from the remote control device 120, the display device 110 may start pairing setting with the remote control device 120 based on the received IR key. The display device 110 may proactively perform the pairing operation with the remote control device 120. Through the pairing, the display device 110 may communicate with the remote control device 120. The display device 110 may be controlled by the remote control device 120. In addition, based on the pairing, the display device 110 may transmit not only the code set to the remote control device 120 but also various information (e.g., STB IR data) to the remote control device 120. Based on the pairing, the display device 110 may perform flag setting with the remote control device 120.

According to one embodiment, the display device 110 may transmit STB IR information to the remote control device 120 (S318). Based on the pairing with the remote control device 120 (e.g., a remote control), the display device 110 may transmit the STB IR information to the remote control device 120 to set a STB flag. The process of setting the STB flag may be essentially or selectively required for the display 110 to share the code set received from the IR server 150 with the remote control device 120. The above-described pairing process and flag setting process may be performed between the display device 110 and the IR blaster 140. Accordingly, the display device 110 may transmit a code set received from the IR server 150 to the IR blaster 140 and the IR blaster 140 may store the received code set.

According to one embodiment, the display device 110 may perform STB flag setting with the remote control device 120 (S320). When confirming that information including an identifier of the peripheral device 130 is transmitted to the remote control device 120, the display device 110 may perform the STB flag setting with the peripheral device 130. Through the STB flag setting, the display device 110 may be controlled by the peripheral device 130 and the remote control device 120.

FIG. 4 is a flow chart showing an operation of a system according to an embodiment of the present disclosure.

Hereinafter, referring to FIG. 4, the operation of the system will be described in detail according to one embodiment of the present disclosure.

According to one embodiment, the remote control device 120 may identify whether a key input occurs (S410). In a state where the display device 110 is powered on, the remote control device 120 (e.g., a remote control) may identify whether at least one key provided in the remote control device 120 (e.g., a remote control) is input by the user. The at least one key may be the keys provided in the remote control device 120 (e.g., a remote control) except the power key.

According to one embodiment, the remote control device 120 may transmit a code for the key to the display device 110 (S412). Once identifying that at least one key provided in the remote control device 120 (e.g., a remote control) is input by the user, the remote control device 120 (e.g., a remote control) may extract a code for the input at least one key from the stored code set. The remote control device 120 (e.g., a remote control) may transmit information including the code extracted from the code set to the display device 110. The extracted code may include a code for mapping the input key and a corresponding IR code. The remote control device 120 may transmit the code for the key to the display device 110 through BLE (Bluetooth low energy). The BLE is a low-power wireless communication protocol that supplements a large amount of power consumption which is a disadvantage of conventional Bluetooth. The remote control device 120 may communicate with the display device 110 and the peripheral device 130 through BLE.

According to one embodiment, the display device 110 may transmit Ack (acknowledge) to the remote control device 120 (e.g., a remote control) (S414). The display device 110 may transmit Ack to the remote control device 120 (e.g., a remote control) in response to the reception of information including a code extracted from the code set.

According to one embodiment, the display device 110 may transmit an IR code command for the key to the IR blaster 140 (S146). The memory of the display device 110 may include at least one key provided in the remote control device 120 (e.g., a remote control) and at least one IR code mapping each key. The display device 110 may identify the code received from the remote control device 120 (e.g., a remote control) and transmit a corresponding IR code to the IR blaster 140. The display device 110 may transmit an IR code command for the key to the IR blaster 140 through the BLE.

According to one embodiment, the IR blaster 140 may transmit a STB IR code for the key to the peripheral device 130 (e.g., STB) (S418). The IR blaster 140 may be located within a predetermined distance (e.g., 1 m) of the peripheral device 130 (e.g., STB) so that it may transmit the signal or information received from at least one of the display device 110 or the remote control device (e.g., a remote control) to the peripheral device 130 (e.g., STB). The IR blaster 140 may perform pairing with the display device 110. In the embodiment, the IR blaster 140 may perform pairing with the display device 110 through at least one operation shown in FIG. 3. In this instance, the IR blaster 140 may serve a role of the remote control device 120. The IR blaster 140 may perform at least one operation performed by the remote control device 120.

According to one embodiment, the peripheral device 130 (e.g., STB) may transmit a control signal for the key to the display device 110. When receiving an IR code for the key input of the remote control device (S410) from the IR blaster 140, the peripheral device 130 (e.g., STB) may transmit a control signal for the key to the display device 110. The control signal may include at least one command for performing a substantial operation based on the key input (S410). The control signal may be transmitted to the display device 110 by a wire or wirelessly.

According to one embodiment, the display device 110 may perform an operation based on the key (S422). The display device 110 may perform a substantial operation based on the key input (S410) of the remote control device 120. The key may be the keys provided in the remote control device 120 (e.g., a remote control), except the power key. As one example, the key may include a number key, a direction key, a volume control key, a channel change key, a power key, a menu key, a setting control key, etc.

FIG. 5 is a flow chart showing an operation of a system according to another embodiment of the present disclosure.

Hereinafter, referring to FIG. 5, the operation of the system according to another embodiment will be described in detail.

According to this embodiment, the remote control device 120 may identify whether a power key for the peripheral device 130 (e.g., STB) is input (S510). The remote control 120 (e.g., a remote control) may identify whether a STB power key of the remote control device 120 (e.g., a remote control) is input by the user. The STB power key may be a key for controlling ON/OFF of the power of the peripheral device 130 (e.g., STB). The STB power key may be provided in a left portion or a right portion of an upper end of the remote control device 120 (e.g., a remote control).

According to an embodiment, the remote control device 120 may transmit a code for a STB power key to the display device 110 (S512). When identifying the input of the STB power key by the user, the remote control device 120 (e.g., a remote control) may extract a code for the input STB power key from the stored code set. The remote control device 120 (e.g., a remote control) may transmit information including the code extracted from the code set to the display device 110. The extracted code may include a code for mapping the STB power key and a corresponding IR code. The remote control device 120 may transmit the code for the STB power key to the display device 110 through BLE.

In this embodiment, the display device 110 may transmit an Ack to the remote control device 120 (e.g., a remote control) (S514). As one example, when it is in an ON-state, the display device may transmit an Ack to the remote control device 120 in response to the reception of the information including the code for the STB power key from the remote control device 120.

In the embodiment, the display device 110 may transmit an IR code command for the STB power key to the IR blaster 140 (S516). The memory of the display device 110 may include at least one IR code for mapping a STB power key of the remote control device 120 (e.g., a remote control). The display device 110 may identify a code for the STB power key received from the remote control device 120 (e.g., a remote control) and transmit a corresponding identified code to the IR blaster 140. The display device 110 may transmit an IR code command for the STB power key to the IR blaster 140 through BLE. The IR blaster 140 may perform pairing with the display device 110. According to an embodiment, the IR blaster 140 may perform the pairing with the display device 110 through at least one operation shown in FIG. 3. In this instance, the IR blaster 140 may perform at least one operation performed by the remote control device 120. The IR blaster 140 may receive a command instructing to transmit an IR code for the STB power key from the display device 110 through the pairing.

In this embodiment, the IR blaster 140 may transmit a STB IR code for the STB power key to the peripheral device 130 (e.g., STB) (S518). The IR blaster 140 may receive a command for the STB IR code for the STB power key received from the display device 110. The command may include at least one instruction for allowing the IT blaster 140 to control ON and OFF of the power of the peripheral device 130 (e.g., STB). The IR blaster 140 may transmit a STB power key IR code configured to map with the command based on the reception of the command to the peripheral device 130 (e.g., STB).

According to the embodiment, the peripheral device 130 (e.g., STB) may perform an operation corresponding to the STB power key (S520). As one example, when the STB power key IR code includes an instruction for controlling the power of the peripheral device 130 (e.g., STB) to be ON in case the peripheral device 130 (e.g., STB) is currently in an OFF state, the peripheral device 130 (e.g., STB) may control at least one component provided therein (e.g., a processor, a power supply source, etc.) to be converted into an ON state. Conversely, when the STB power key IR code includes an instruction for controlling the power of the peripheral device 130 (e.g., STB) to be OFF in case the peripheral device 130 (e.g., STB) is currently in an ON state, the peripheral device 130 (e.g., STB) may control at least one component provided therein (e.g., a processor, a power supply source, etc.) to be converted into an OFF state.

FIG. 6 is a flow chart showing an operation of a system according to a further embodiment of the present disclosure.

Hereinafter, referring to FIG. 6, the operation of a system according to another embodiment of the present disclosure will be described below.

According to this embodiment, the remote control device 120 may identify whether a power key for the peripheral device 130 (e.g., STB) is input (S610). The remote control device 120 (e.g., a remote control) may identify whether the STB power key constituting the remote control device 120 (e.g., a remote control) is input by the user.

In this embodiment, the remote control device 120 may transmit a code for the STB power key to the display device 110. Once identifying that the STB power key is input, the remote control device 120 may extract a code for the STB power key from the pre-stored code set. The remote control device 120 may transmit information including the code extracted from the code set to the display device 110. The extracted code may include a code or information for mapping the STB power key with a corresponding IR code. The remote control device 120 may transmit the code for the STB power key to the display device 110 through BLE.

In this embodiment, the display device 110 may transmit Ack to the remote control device 120 (e.g., a remote control) (S614). As one example, the display device 110 may transmit Ack to the remote control device 120 (e.g., a remote control) in response to the reception of the information including the code for the STB power key.

In the embodiment, the display device 110 the Ack transmitted by the display device 110 may not be transmitted to the remote control device 120 (S614). If the communication (e.g., BLE) environment between the remote control device 120 and the display device 110 is not good, the Ack transmitted by the display device 110 may not be transmitted to the remote control device 120.

According to the embodiment, the remote control device 120 may identify whether Ack is received from the display device 110 within a predetermined time (S616). After transmitting the code for the STB power code to the display device 110, the remote control device 120 may drive a timer (not shown) and check whether Ack is received from the display device 110 within a predetermined time period. As one example, when receiving the code for the STB power key from the display device 110 within the predetermined time period (e.g., 150 ms), the remote control device 120 may switch to an operation standby mode and then identify whether an additional key is input by the user.

In the embodiment, the remote control device 120 may transmit an emergency STB power IR code to the peripheral device 130 (e.g., STB) based on a STB flag set with the display device 110 and (S618). The remote control device 120 may transmit a code for the STB power key to the display device 110 through BLE (S612) and then drive a timer (not shown). Unless receiving Ack from the display device 110 within a predetermined time period in response to the transmission of the code for the STB power key, the remote control device 120 may transmit the emergency STB power IR code to the peripheral device 130 based on the display device 110 and the preset STB flag. According to the embodiment, the power intensity of the emergency STB power IR key may be greater than that of the conventional STB power IR key. Alternatively, the emergency STB power IR key may be encoded in the remote control device 120 and transmitted to the peripheral device through BLE. The remote control device 120 may the STB power IR code to the peripheral device 130 through BLE.

Through the process S618, the remote control device 120 may control ON/OFF of the power of the peripheral device 130. The remote control device 120 may transmit a STB power key IR code mapping with the STB power key to the peripheral control device 130 (e.g., STB). As one example, the remote control device 120 may transmit a STB power key IR code mapping with the STB power key to the peripheral device 130 to be controlled through ON and OFF of the power of the peripheral device 130 (e.g., STB).

In the embodiment, the peripheral device 130 (e.g., STB) may perform an operation corresponding to the STB power key (S620). As one example, when the STB power key IR code includes an instruction for operating the power of the peripheral device 130 (e.g., STB) to be ON in a state where the peripheral device 130 (e.g., STB) is currently in an OFF state, the peripheral device 130 (e.g., STB) may control at least one of the components (e.g., a processor, a power supply source, etc) provided therein to switch to an ON state. Conversely, when the STB power key IR code includes an instruction for operating the power of the peripheral device 130 (e.g., STB) to be OFF in a state where the peripheral device 130 (e.g., STB) is currently in an ON state, the peripheral device 130 (e.g., STB) may control at least one of the components (e.g., a processor, a power supply source, etc) provided therein to switch to an OFF state.

FIG. 7 is a schematic view of a display device according to an embodiment of the present disclosure.

Referring to FIG. 7, the display device 110 according to the embodiment of the present disclosure may include a communication unit 720 including a wireless communication circuit 721 and a wired communication circuit 722, an input 730, a memory 740, a display 750, an audio output 760 and a processor 710.

According to the embodiment, the communication unit 720 may include at least one circuit provided in the network interface 113 of FIG. 1 to perform wired communication or wireless communication. The communication unit 720 may implement at least one function or operation performed by the network interface 113 of FIG. 1. The communication unit 720 may include the wireless communication circuit 721 and the wireless communication circuit 721, to build a direct communication channel or a wireless communication channel with at least one of the IR server 150, the peripheral device 130 (e.g., STB), the IR blaster 140 or the remote control device 130, and perform communication configured to transceive a signal, information or an instruction through the built communication channel. The communication unit 720 may be configured to transceive a signal, information or an instruction with the remote control device 120 via the wireless communication circuit 721. The wireless communication circuit 721 may perform wireless communication with at least one of the IR blaster 140 or the remote control device 120 based on BLE. Each of the wired communication circuit 722 and the wireless communication circuit 721 provided in the communication unit 720 may include at least one processor (e.g., a communication circuit) for performing wired or wireless communication with other devices.

In the embodiment, the input 730 may receive an input of a command to be used for at least one component constituting the display device 110 (e.g., the processor 710, the display 750, the communication unit 720, the audio output 760 and the memory 740). The input unit 730 may include a volume control key, a channel change key, a menu key and a power key.

According to the embodiment, the memory 740 may include at least one data or instruction stored in the storage of FIG. 1. The memory 740 may perform at least one function or operation performed by the storage 130 of FIG. 1. The memory 740 may store the code set received from the IR server 150. The code set may include each code for at least one key (e.g., a number key, a direction key, a volume control key, a channel change key and a power code) provided in the remote control device 120 (e.g., a remote control). The code set may include an instruction word for executing a corresponding function based on the input for at least one key (e.g., a touch input, a push input or a voice input) provided in the remote control device 120 (e.g., a remote control). The memory 740 may store various instructions or data used by at least one component of the display 110.

In the embodiment, the display 750 may perform at least one function or operation performed by the display 750 of FIG. 1. The display 750 may visually provide information. As one example, the display 750 may a control circuit for controlling the STB 130, the remote control device 120 and the IR blaster 140. Specifically, the display 740 may include a touch circuit sense a touch or a sensor circuit (e.g., a pressure sensor) measure the intensity of the power generated by the touch.

In the embodiment, the audio output 760 may perform at least one function or operation performed by the audio output 160 of FIG. 1. The audio output 760 may convert a sound into an electric signal, or vice versa. The audio output 760 may output sounds via a speaker or headphone directly or wirelessly connected to the display device 110.

In the embodiment, the processor 710 may include at least one circuit provided in the controller 180 of FIG. 1 to control the overall operation of the display device 110. The processor 710 may perform at least one function or operation performed by the controller 180 of FIG. 1. The processor 710 may execute an instruction or software to control at least one other component connected to the processor 710 (e.g., the communication unit 720, the input 730, the memory 740, the display 750 and the audio output 760, and execute various data processes or calculations. The processor 710 may load the command or data received through the communication unit 720 to the memory 740, process the command or data stored in the memory 740, and store the result data in the memory 740. The memory 740 may include a volatile memory (not shown) and a non-volatile memory (not shown).

In the embodiment, the processor 710 may receive a first code for a first key input from the remote control device 120 through the communication unit 720. The processor 710 may identify whether codes for at least one key (e.g., a number key, a direction key, a volume control key, a channel change key, a power key, a menu key, a setting control key, etc.) provided in the remote control device 120 (e.g., a remote control) is received through the communication unit 720 (e.g., the wireless communication circuit 721). The at least one key may include the other keys except the power key for controlling ON/OFF of the power of the peripheral device 130 (e.g., STB) among the plurality of keys provided in the remote control device 120 (e.g., a remote control).

In the embodiment, the processor 710 may transmit a command for the received first code to the IR blaster 140 through the communication unit 720. The processor 710 may identify an IR code corresponding to the key from the remote control device 120 (e.g., a remote control), and transmit the identified IR code to the IR blaster 140. The processor 710 may transmit the IR code command for the key to the IR blaster 140 through the wireless communication circuit 721 (e.g., BLE). The command for the received first code may include an instruction for controlling the IR blaster 140 pairing with the display 110 to transmit an infrared ray code for the first code to the peripheral device 130.

In the embodiment, the processor 710 may operate the display device based on reception of a control signal for the key from the peripheral device 130 connected to be operable with the display device 110. The control signal may include at least one instruction for substantially operating the display device 110 based on the key. The display device 110 may receive the control signal from the peripheral device 130 via a wire or wirelessly.

In the embodiment, the processor 710 may identify whether a code for a STB power key for controlling ON/OFF of the power of the peripheral device 130 (e.g., STB) is received from the remote control device 120. As one example, when the display device 110 is currently in an ON state, the processor 710 may receive the code for the STB power key from the remote control device 120 through the wireless communication circuit 721 (e.g., BLE) of the communication unit 720.

FIG. 8 is a flow chart showing an operation of a display device according to an embodiment of the present disclosure.

Hereinafter, referring to FIG. 8, the operation of the display device according to an embodiment of the display device will be described in detail.

According to the embodiment, the display device 110 (e.g., the processor 710) may transmit display device information to the IR server (S810). The display device 110 may transmit information about the display device 110 to the IR server 150, to obtain information about the peripheral device 130 based on the sensing of the display device 110 (e.g., the processor 710) connected with the peripheral device 130 (e.g., STB). The information about the display device 110 may include an identifier of the display device 110 (e.g., IP address, MAC address, a production number, etc.). In addition, the information on the display device 110 may include at least one of an identifier of the peripheral device 130 (e.g., STB) or an identifier of the remote control device 120 (e.g., a remote control).

According to the embodiment, the display device 110 (e.g., the processor 710) may receive and store a code set from the IR server (S812). The display device 110 may the received code set in the memory 740 (e.g., a non-volatile memory (not shown)). The code set may include each code for at least one key (e.g., a number key, a direction key, a volume control key, a channel change key, a power key, etc.) provided in the remote control device 120 (e.g., a remote control). The code set may include an instruction for operating a corresponding function based on the input (e.g., a touch input, a push input, and a voice input) for at least one key provided in the remote control device 120 (e.g., a remote control). The at least one key may be the keys except the power key provided in the remote control device 120 (e.g., a remote control).

In the embodiment, the display device 110 (e.g., the processor 710) may identify whether a code for a first key is received from the remote control device 120 (S814). As one example, when the user inputs at least one key provided in the remote control device 120, the remote control device 120 may transmit a code for the key to the display device 110 (e.g., the communication unit 720). Here, the display device 110 (e.g., the processor 710) may identify whether a code for the key is received from the remote control device 120.

In the embodiment, the display device 110 may identify an IR code for the received first key among the stored code sets (S816). The display device 110 (e.g., the processor 710) may identify the presence of the IR code for the received key among the code sets pre-stored after received from the IR server 150. As one example, unless the IR code for the received key is present among the code sets pre-stored after received from the IR server 150, the display device 110 (e.g., the processor) may make a request for the IR code to the IR server 150. If there is no IR code for the received key among the code sets pre-stored after received from the IR server 150, the information on the display device 110 may be transmitted to the IR server 150 again to request the code set again.

In the embodiment, the display device 110 (e.g., the processor 710) may transmit a transmission command for the IR code to the IR blaster 140 based on the identified IR code. The display device 110 may receive a code for the key from the remote control device 120 (e.g., a remote control), and may transmit an IR code corresponding to the received code to the IR blaster 140. The display device 110 may transmit an IR code command for the key to the IR blaster 140 through BLE.

In the embodiment, the display device 110 (e.g., the processor 710) may identify whether an operation command for the first key is received from the peripheral device 130 (S820). Once receiving an IR code for the key input (S410) provided in the remote control device 120 from the IR blaster 140, the peripheral device 130 (e.g., STB) may transmit a control signal for the key to the display device 110. The control signal may include at least one instruction for executing a substantial operation based on the key input (S410). The control signal may be transmitted to the display device 110 via wire or wirelessly. The display device 110 (e.g., the processor 710) may receive the control signal through the wired communication circuit 722 of the communication unit 720.

In the embodiment, the display device 110 (e.g., the processor 720) may perform an operation based on the first key (S822). The display device (e.g., the processor 710) may execute a substantial operation based on the key input to the remote control device 120. The key may be the other keys provided in the remote control device 120 (e.g., a remote control) except the power key. As one example, the key may include a number key, a direction key, a volume control key, a channel change key, a power key, a menu key, a setting control key, etc.).

FIG. 9 is a schematic view of a remote control device according to an embodiment of the present disclosure. FIG. 10 is an exemplary view of a remote control device according to an embodiment of the present disclosure.

Referring to FIGS. 9 and 10, the remote control device 120 according to the embodiment of the present disclosure may include a communication unit 920 including a RF communication unit 921 and an IR communication unit 922, a power supply source 930, an input 940, a display 951, an output 950 including a vibration module 952 and an LED module, a memory 960 and a memory 910.

In the embodiment, the communication unit 920 may include the RF communication unit 921 configured to wirelessly transceive a signal with the display device 110, and the IR communication unit 922 configured to transceive a signal using an infrared ray with the peripheral device 130.

The RF communication unit 921 may include at least one circuit for transmitting at least one code for at least one key 1020, 1030, 1040, 1050 and 1060 of FIG. 10 provided in the remote control device 120 to the wireless communication circuit 721 of the display device 110. The IR communication unit 922 may include at least one circuit for transmitting a code for the power key of the remote control device 120 to the peripheral deice 130 through IR.

In the embodiment, the power supply source 930 may be configured to supply the power required to operate the remote control device 120 to each component of the remote control device 120.

In the embodiment, the input 940 may be configured of a key pad, a button, a touch pad or a touch screen. The user may input a command related to the display device 110 or a command related to the peripheral device 130 by manipulating the input 940. When the input 940 includes a hard key button, the user may input the command related to the display device 110 by pushing the hard key button. As one example, at least one button of the input 235 may be made of rubber, and may be protruded from a surface of the remote control device 120. The input 940 may include a first power key 1010 configured to control ON/OFF of the power of the remote control device 120, and a second power key 1020 configured to control ON/OFF of the power of the display device 110. In addition, the input 940 may include various buttons such as a number button, a channel button, a volume button, etc. the input 940 may also include various kinds of input means operable by the user such as a scroll key, a jog key and the like. This embodiment may not limit the scope claimed by the present disclosure.

According to the embodiment, the output 950 may include the display 951, the vibration module 952 and the LED module 953. The output 950 may notify the user of the reception of the signal through at least one of the display 951, the vibration module 952 or the LED module 953, corresponding to the user's manipulation of the input 940 or in response to the reception of the signal from the display device 110. The user may recognize whether to manipulate the input 940 or control the display device 110 through the output 950. As one example, when receiving the signal from the display device 110 by manipulation of the input 940 or through the RF communication unit 921, the output 950 may blink the LED module, vibrate the vibration module 952 or output a corresponding image on the display 951.

In the embodiment, the memory 960 may store several programs and application data required by the control or operation of the remote control device 120. As one example, when the remote control device 120 wirelessly transceive the signal with the display device 110 through the RF communication unit 921, the remote control device 120 and the display device 100 may transceive a signal in a predetermined frequency band. Under the control of the processor 910, the memory 960 may store a code set received from the display device 110. The code set may include an instruction for operating a corresponding function based on an input (e.g., a touch input, a push input or a voice input) of at least one key provided in the input 940 of the remote control device 120 (e.g., a remote control).

In the embodiment, the processor 910 may store information on the frequency band for wirelessly transceiving the signal with the display device 110 paired with the remote control device 120 in the memory, and refer to the stored information. The processor 910 may control all matters related to the control of the remote control device 120. The processor 910 may transmit a code corresponding to a predetermined key manipulation of the input 940 to the display device 110 or the peripheral device 130. In the embodiment, the processor 910 may include a circuit for transmission to the wireless communication circuit 721 of the display device 110. The processor 910 may transmit a code corresponding to the predetermined key manipulation of the input 940 to the wireless communication circuit 721 through BLE. According to the embodiment, the processor 910 may include a circuit for transmitting a code corresponding to a power key 1010 for controlling ON/OFF of the power of the peripheral device provided in the input 940 to the peripheral device 130 through IR.

FIG. 11 is a flow chart showing an operation of a remote control device according to an embodiment of the present disclosure.

Hereinafter, referring to FIG. 11, the operation of the remote control device according to an embodiment of the present disclosure will be described in detail.

In the embodiment, the remote control device 120 may receive and store a code set from the display device 110 (S1110) the remote control device 120 (e.g., the processor 910) may receive the code set from the display device 110 and store it in the memory 960. The code set may include each code for at least one key (e.g., a number key, a direction key, a volume control key, a channel change key, a power key, etc.) provided in the remote control device 120 (e.g., a remote control). The code set may include an instruction for operating a corresponding function based on an input (e.g., a touch input, a push input or a voice input) of the at least one key provided in the remote control device 120 (e.g., a remote control).

In the embodiment, the remote control device 120 may identify whether a STB power key is input (S1102). The remote control device 120 (e.g., the processor 910) may identify whether the power key for the peripheral device 130 (e.g., STB) is input through the power key 1010 provided in the input 940. The remote control device 120 (e.g., a remote control) may identify whether a STB power key provided therein is input by the user/

In the embodiment, the remote control device 120 may transmit a code for the STB power key to the display device 120 (S1014). Once identifying that the STB power key is input, the remote control device 120 (e.g., the processor 910) may extract a code for the STB power key from the code set pre-stored in the memory 960. The remote control device 120 (e.g., the processor 910) may transmit information including the code extracted from the code set to the display device 110 through the RF communication unit 921. The extracted code may include a code or information mapping the STB power key with the corresponding IR code. The remote control device 120 may transmit the code for the STB power key to the display device 110 through BLE.

In the embodiment, the remote control device 120 may identify whether Ack is received within a predetermined time period (S1116).

In the embodiment, the Ack transmitted by the display device 110 may not reach the remote control device 120. After transmitting the code for the STB power key to the display device 110 (S612), the remote control device 120 (e.g., the processor 910) may drive a timer and then check whether Ack is received from the display device 110 for a predetermined time period.

In the embodiment, the remote control device 120 may transmit an emergency STB power IR code to the peripheral device 130 based on a STB flag set with the display device (S1118). The remote control device 120 (e.g., the processor 910) may transmit an emergency STB power IR code to the peripheral device 130 (e.g., STB) through the IR communication unit 922 of the communication unit 920 based on a STB flag set with the display device 110. Through this process S1118, the remote control device 120 (e.g., the processor 910) may control ON/OFF of the power of the peripheral device 130. As one example, the remote control device 120 (e.g., the processor 910) may transmit a STB power key IR code mapped to the STB power key to be controlled by ON/OFF of the power of the peripheral device 130 to the peripheral device 130 through the IR communication unit 922 of the communication unit 920.

Each step in each of the flow charts described above may be operated independently from the illustrated order or performed simultaneously. At least one component of the present disclosure and at least one operation performed by the at least one component may be implemented in hardware and/or software.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. A display device comprising:
a display configured to display visual information;
an audio output configured to convert electrical signals into sounds and output the sounds through a speaker;
a communication unit, based on a wireless protocol that does not include IR communication, configured to receive a first code for a first key input from a remote control device;
a memory; and
at least one processor configured to:
transmit information of the display device to an IR (infrared) server through the communication unit;
store a code set received from the IR server in the memory in response to transmission of the information of the display device;
determine an IR code corresponding to the received first code among the stored code set;
transmit a command for the determined IR code to an IR blaster through the communication unit based on a wireless protocol that does not include IR communication, causing the IR blaster to further transmit the command for the determined IR code to a peripheral device,
operate the display device based on receiving a control signal for the first key from the peripheral device connected to be operable with the display device, the control signal being generated by the peripheral device based on the command for the determined IR code; and
output operation results of the display device through the display and the audio output.

2. The display device of claim 1, wherein the code set comprises an IR code for each of at least one key provided in the remote control device configured to control the display device.

3. The display device of claim 1, wherein the IR code is used by the peripheral device to generate the control signal for the first key.

4. The display device of claim 1, wherein the at least one processor is further configured to:

if the IR blaster transmits the determined IR code to the peripheral device, receive the control signal from the peripheral device, and
operate the display device based on the received control signal.

5. The display device of claim 1, wherein the at least one processor is further configured to:
transmit the command to the IR blaster when the display device is currently in an ON state, and
switch the display device into an ON state based on receiving an emergency IR code for the first key from the remote control device when the display device is currently in an OFF state.

6. The display device of claim 1, wherein the at least one processor is further configured to:
identify whether a second code for a second key for controlling power of the peripheral device is received from the remote control device through the communication unit, and
transmit a command for the second code to the IR blaster based on receiving the second code.

7. The display device of claim 6, wherein the command for the second code controls the IR blaster to transmit an IR code for the second code to the peripheral device.

8. The display device of claim 7, wherein the second key is a power key provided in the remote control device to control the power of the peripheral device, and
wherein the first key includes at least one key other than the second key provided in the remote control device.

9. A device comprising:
a display;
an audio output;
a communication unit;
at least one processor; and
a memory connected to be operable with the display, the audio output, the communication unit and the at least one processor,
wherein the memory stores instructions that, when executed by the at least one processor, cause the device to perform operations comprising:
receiving a first code for a first key input from a remote control device through a communication unit, based on a wireless protocol that does not include IR communication,
transmitting information of the device to an IR (infrared) server through the communication unit,
storing a code set received from the IR server in the memory in response to transmission of the information of the device,
determining an IR code corresponding to the received first code among the stored code set,
transmitting a command for the determined IR code to an IR blaster through the communication unit based on a wireless protocol that does not include IR communication, causing the IR blaster to further transmit the command for the determined IR code to a peripheral device,
operating the device based on receiving a control signal for the first key from the peripheral device connected to be operable with the device, the control signal being generated by the peripheral device based on the command for the determined IR code, and
outputting operation results of the device through the display and the audio output.

10. The device of claim 9, wherein the code set comprises an IR code for each of at least one key provided in the remote control device configured to remotely control the device.

11. The device of claim 9, wherein the IR code is used by the peripheral device to generate the control signal for the first key.

12. The device of claim 9, wherein the instructions comprises instructions for instructing the at least one processor to, if the IR blaster transmits the determined IR code to the peripheral device, receive the control signal from the peripheral device, and operating the device based on the received control signal.

13. The device of claim 9, wherein the instructions comprise instructions for instructing the at least one processor to transmit the command to the IR blaster when the device is currently in an ON-state, and switch the device into an ON-state based on receiving an emergency IR code for the first key from the remote control device when the device is currently in an OFF-state.

14. The device of claim 9, wherein the instructions comprise instructions for instructing the at least one processor to identify whether a second code for a second key for controlling power of the peripheral device is received from the remote control device through the communication unit, and transmitting a command for the second code to the IR blaster based on receiving the second code.

15. The device of claim 14, wherein the command for the second code controls the IR blaster to transmit an IR code for the second code to the peripheral device.

16. The device of claim 15, wherein the second key is a power key provided in the remote control device to control the power of the peripheral device, and wherein the first key includes at least one key other than the second key provided in the remote control device.

17. A method for controlling a display device comprising a display configured to display visual information and an audio output configured to convert electrical signals into sounds and output the sounds through a speaker, the method comprising:

transmitting information of the display device to an IR (infrared) server;

storing a code set received from the IR server in a memory in response to transmission of the information of the display device;

receiving a first code for a first key input from a remote control device through a communication unit, based on a wireless protocol that does not include IR communication, determining an IR code corresponding to the received first code among the stored code set;

transmitting a command for the determined IR code to an IR blaster through the communication unit based on a wireless protocol that does not include IR communication, causing the IR blaster to further transmit the command for the determined IR code to a peripheral device;

operating the display device based on receiving a control signal for the first key from a peripheral device connected to be operable with the display device, the control signal being generated by the peripheral device based on the command for the determined IR code; and outputting operation results of the display device through the display and the audio output.

18. The method for controlling the display device of claim 17, wherein the IR code is used by the peripheral device to generate the control signal for the first key.

19. The method for controlling the display device of claim 17, further comprising:

if the IR blaster transmits the determined IR code to the peripheral device, receiving the control signal from the peripheral device; and operating the display device based on the received control signal.

20. The method for controlling the display device of claim 17, further comprising:

transmitting the command to the IR blaster when the display device is currently in an ON-state; and switching the display device into an ON-state based on receiving an emergency IR code for the first key from the remote control device when the display device is currently in an OFF-state.

21. The method for controlling the display device of claim 17, further comprising:

identifying whether a second code for a second key for controlling power of the peripheral device is received from the remote control device through the communication unit; and transmitting a command for the second code to the IR blaster based on receiving the second code.

22. The method for controlling the display device of claim 21, wherein the command for the second code controls the IR blaster to transmit an IR code for the second code to the peripheral device.

23. The display device of claim 22, wherein the second key is a power key provided in the remote control device to control the power of the peripheral device, and wherein the first key includes at least one key other than the second key provided in the remote control device.

* * * * *